United States Patent

Fetter

(10) Patent No.: US 10,732,362 B1
(45) Date of Patent: Aug. 4, 2020

(54) OPTICAL FIBER RECEPTACLE COVER

(71) Applicant: HONEYWELL FEDERAL MANUFACTURING & TECHNOLOGIES, LLC, Kansas City, MO (US)

(72) Inventor: Travis L. Fetter, Lexington, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 16/437,013

(22) Filed: Jun. 11, 2019

(51) Int. Cl.
    *G02B 6/38* (2006.01)
    *H01R 13/447* (2006.01)

(52) U.S. Cl.
    CPC ......... *G02B 6/3849* (2013.01); *G02B 6/3879* (2013.01); *G02B 6/3897* (2013.01); *H01R 13/447* (2013.01)

(58) Field of Classification Search
    CPC .. G02B 6/3817; G02B 6/3825; G02B 6/3849; G02B 6/3879; G02B 6/3897; H02G 3/14; H01R 13/447; H01R 13/5213
    USPC ........... 385/134–139; 174/50, 50.51, 66, 67; 439/133, 139, 140, 147
    See application file for complete search history.

(56) References Cited

U.S. PATENT DOCUMENTS

| | | | |
|---|---|---|---|
| 4,952,756 A | 8/1990 | Meyers | |
| 5,387,761 A * | 2/1995 | Simonis | H01R 13/447 174/67 |
| 5,599,206 A | 2/1997 | Slack et al. | |
| 5,664,955 A * | 9/1997 | Arnett | G02B 6/3817 174/67 |
| 6,913,395 B2 * | 7/2005 | Watanabe | G02B 6/3825 174/67 |
| 6,916,989 B2 | 7/2005 | Broussard, Jr. | |
| 7,094,969 B1 | 8/2006 | In | |
| 7,284,995 B1 * | 10/2007 | Vail | H01R 13/447 439/133 |
| 7,390,966 B1 | 6/2008 | Shotey et al. | |
| 7,728,226 B2 * | 6/2010 | Drane | H01H 21/085 174/66 |
| 8,399,765 B1 | 3/2013 | Baldwin et al. | |
| 2018/0059347 A1 | 3/2018 | Kusuda et al. | |

* cited by examiner

*Primary Examiner* — Michael P Mooney
(74) *Attorney, Agent, or Firm* — Hovey Williams LLP

(57) ABSTRACT

A cover for partially covering and protecting cables plugged into a receptacle is provided. The receptacle includes a face plate with a first hole through which a first fastener secures the face plate to a face of the receptacle. The cover comprises a plurality of walls at least partially defining a hollow chamber, a slot adjacent to the chamber and configured to receive the face plate when the cover is slid over the face plate, an opening that leads to the chamber and the slot, and a first channel extending partially through the chamber and configured to provide access to the fastener.

20 Claims, 4 Drawing Sheets

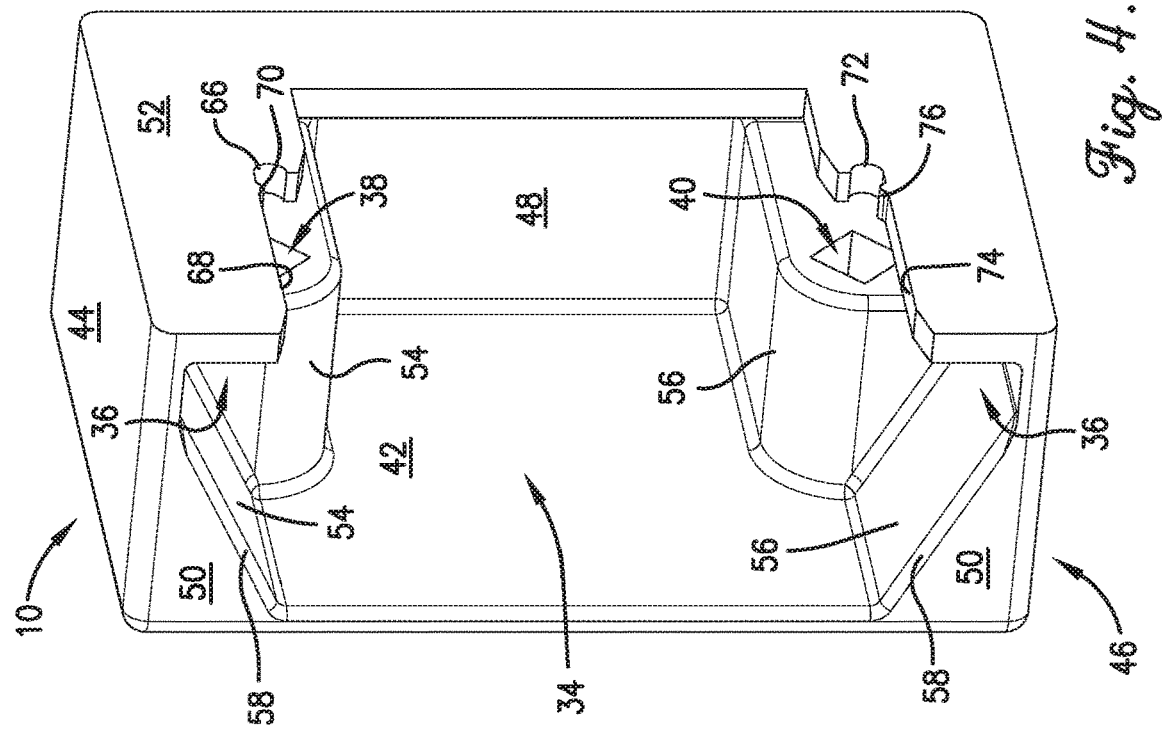
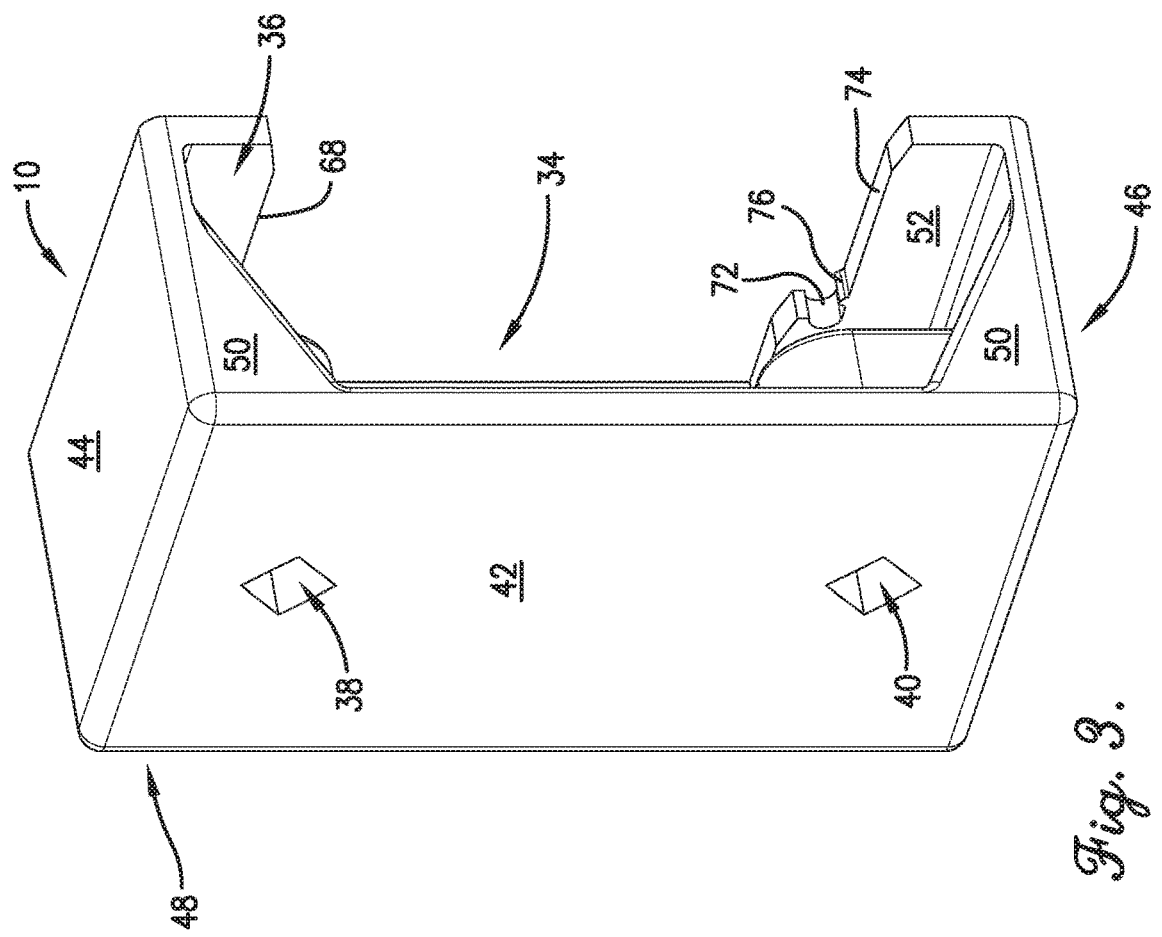

OPTICAL FIBER RECEPTACLE COVER

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Various communication systems and networks employ fiber optic cables to transmit signals. Fiber optic cables are fragile, and damaging them can lead to communication disruptions and failures. Thus, fiber optic cables are often protected by various enclosures and/or installed in or along walls.

Receptacles are used to provide access to such protected fiber optic cables. One or more fiber optic cables may be plugged into such a receptacle to connect to a protected fiber optical cable. The fiber optic cables plugged into a receptacle often protrude from the receptacle and are therefore vulnerable to damage from traffic near the receptacle. Even slight forces applied to the plugged-in fiber optic cables can damage their optical leads and render them inoperable.

The background discussion is intended to provide information related to the present invention which is not necessarily prior art.

SUMMARY

The present invention solves the above-described problems and other related problems and provides a distinct advance in the art of fiber optic cable receptacles. More particularly, the present invention provides a cover that may engage a standard fiber optic receptacle to protect fiber optic cables plugged into the receptacle, thereby protecting both the receptacle and the fiber optic cables plugged into the receptacle.

A cover constructed in accordance with an embodiment of the present invention is provided for engaging a receptacle having a face plate. The face plate may have a first hole through which a screw or other fastener secures the face plate to a face of the receptacle. The cover broadly comprises a plurality of walls at least partially defining a hollow chamber, a slot, an opening, and a first channel. The walls shield the receptacle and the fiber optic cables plugged into the receptacle. The hollow chamber provides space for the fiber optic cables to connect to the receptacle. The slot is adjacent to the chamber and permits the cover to slide over the face plate. The opening leads to the chamber and the slot and permits the cables to extend from the receptacle and cover so they can be connected to communication or computer equipment. The first channel extends from a face wall of the cover partially through the chamber and is configured to provide access to the fastener in the face plate so that it may be fastened to secure the cover and the face plate to the receptacle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 3 is a perspective view of the cover of FIG. 1;

FIG. 4 is a side perspective view of the cover of FIG. 1;

Figure 1:
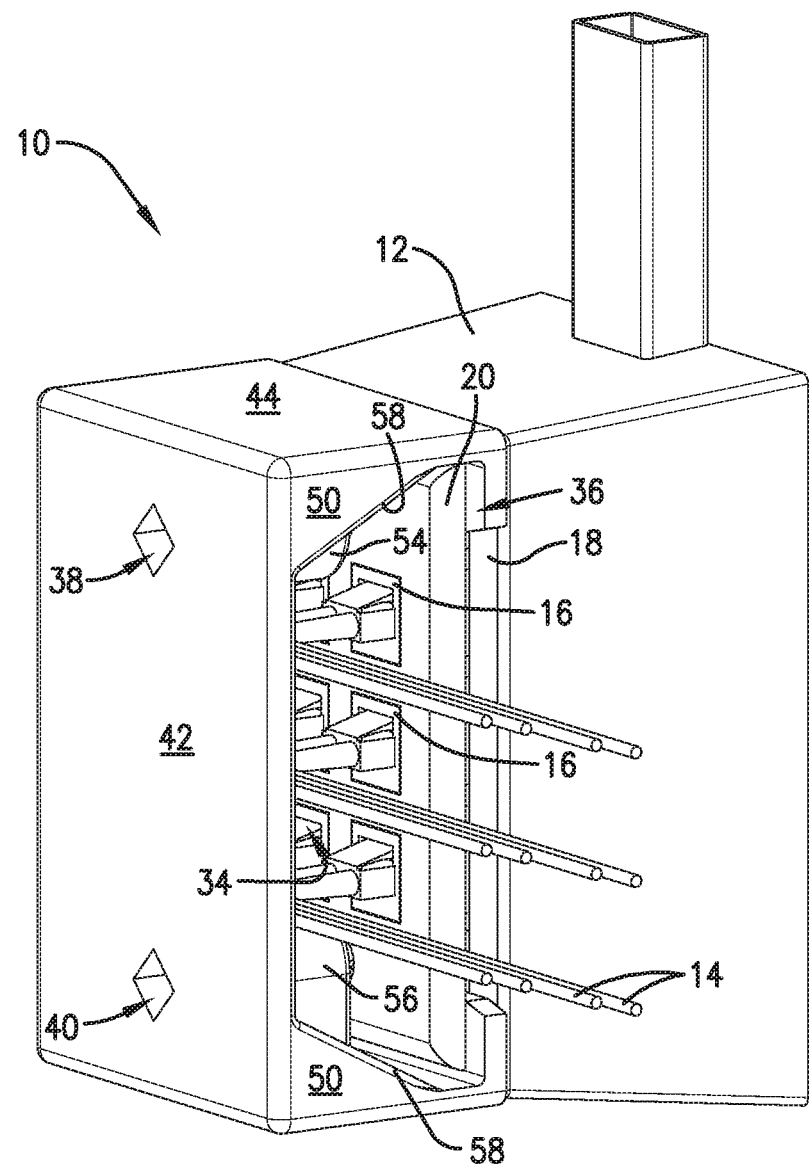
FIG. 1 is perspective view of a cover constructed in accordance with embodiments of the present invention in engagement with a receptacle.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
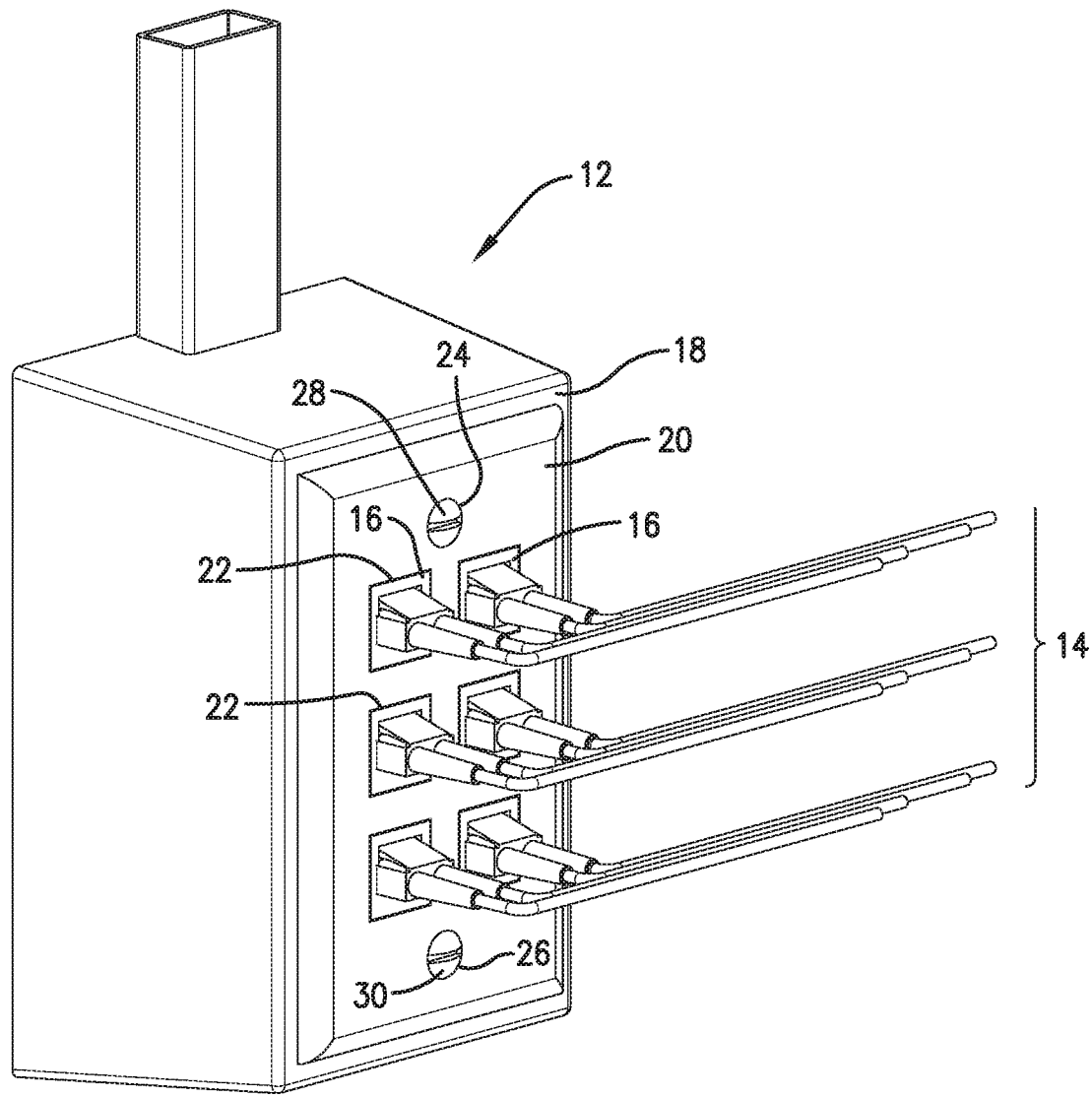
FIG. 2 is a perspective view of the receptacle of FIG. 1.

Turning to FIG. 1, a protective cover 10 constructed in accordance with embodiments of the present invention is illustrated. The cover 10 engages a receptacle 12 to protect one or more fiber optic cables 14 connected to the receptacle 12. As depicted in FIG. 2, the receptacle 12 includes one or more outlets 16 positioned on a face 18 of the receptacle 12 and connected to internal fiber optic cables (not shown). The plurality of outlets 16 are configured to receive the one or more fiber optic cables 14 so that the one or more fiber optic cables 14 are in communication with one or more of the internal fiber optic cables. The receptacle 12 also includes a face plate 20 secured to the face 18 of the receptacle 12 and having outlet openings 22 that allow the one or more fiber optic cables 14 to connect to the outlets 16, as shown in FIG. 2. The face plate 20 may also include fastener openings 24, 26 for receiving fasteners 28, 30 that secure the face plate 20 to the face 18 of the receptacle 12.

Turning to FIG. 3, the cover 10 comprises a number of walls (described below) that define a hollow chamber 34, a slot 36 adjacent to the chamber 34, and a pair of channels 38, 40. The cover 10 may be any shape without departing from the scope of the present invention. For example, the cover 10 may form a semi-cylindrical shape, a capsule shape, a semi-spherical shape, etc. while still defining the chamber 34 and the slot 36. The cover 10 may be a unitary piece formed via additive manufacturing and may be made of plastic, polymer, metal, or the like.

A specific embodiment of the cover 10 is depicted in FIG. 3 and includes a face wall 42, a top wall 44, a bottom wall 46, a first side wall 48, a second side wall 50, and a back wall 52 that collectively define the chamber 34. The cover 10 may further comprise a number of interior walls 54, 56 that define the channels 38, 40. The top wall 44, the bottom wall 46, and the side walls 48, 50 may extend substantially orthogonally from the face wall 42, and the back wall 52 may be substantially perpendicularly connected to the top wall 44, bottom wall 46, and side walls 48, 50.

As shown in FIG. 4, the side wall 50 includes a cable opening 58 that leads to the chamber 34 and the slot 36. The opening 58 and the slot 36 allow the cover 10 to slide over the face plate 20 and couple with the receptacle 12. The opening 58 also allows fiber optic cables 14 plugged into the receptacle 12 to extend out of the chamber 34 as the cover 10 slides into engagement with the receptacle 12. The opening 58 may take on any shape without departing from the scope of the present invention. For example, the side wall 50 may be completely absent so that the opening 58 expands to the edges of the top wall 44, bottom wall 46, and face wall 42. Additionally, the opening 58 may have a portion that outlines the slot 36 and a portion that outlines the chamber 34.

The other side wall 48 located opposite to the opening 58 may act as a stop or abutment configured to abut a portion of the face plate 20 when the cover 10 is completely engaged with the receptacle 12. This prevents the cover 10 from sliding too far over the face plate 20, which may cause the fiber optic cables 14 to be damaged. The side wall 48 may take on any shape without departing from the scope of the present invention. For example, the side wall 48 may merely be one or more protrusion extending from the face wall 42 and/or back wall 52. Alternatively, the side wall 48 may extend an entire length of the face wall 42, as shown in FIG. 4.

Figure 5:
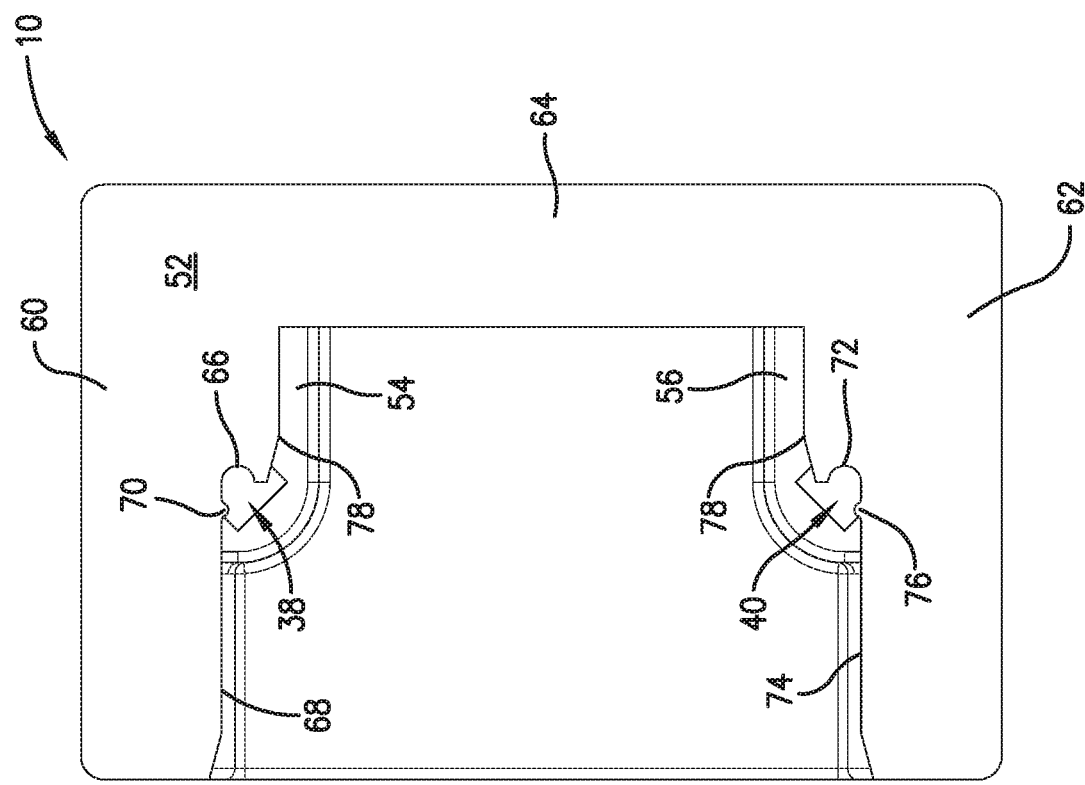
FIG. 5 is a rear perspective view of the cover of FIG. 1.

Turning to FIG. 5, the back wall 52 includes a top portion 60, a bottom portion 62, and an intermediate portion 64 extending between the two portions 60, 62. The top portion 60, the bottom portion 62, and the intermediate portion 64 may partially define the slot 36 and are configured to slide behind the face plate 20. The top portion 60 includes a catch 66 and a guide edge 68. The catch 66 is configured to engage a portion of the fastener 28 behind the face plate 20 when the slot 36 envelopes the face plate 20. The catch 66 may include a concave edge on the top portion 60 having a radius that is close to a radius of the fastener 28. The catch 66 is aligned with the channel 38. The guide edge 68 may extend from the catch 66 to the opening 58 and is configured to slide against the portion of one of the fasteners 28 behind the face plate 20 as the slot 36 envelopes the face plate 20. The guide edge 68 ensures that the cover 10 is being correctly positioned in engagement with the receptacle 12. The guide edge 68 may include a detent 70 configured to hold the portion of the fastener 28 behind the face plate 20 in engagement with the catch 66. The detent 70 may be a bump, a ball-and-spring detent, a flexible portion, or the like and cooperatively engage the portion of the fastener 28 positioned behind the face plate 20 with the catch 66.

The bottom portion 62 also includes a catch 72 and a guide edge 74. The catch 72 is configured to engage a portion of the fastener 30 behind the face plate 20 when the slot 36 envelopes the face plate 20. The catch 72 may include a concave edge on the bottom portion 62 having a radius that is close to a radius of the fastener 30. The catch 72 is aligned with the channel 40. The guide edge 74 may extend from the catch 72 to the opening 58 and is configured to slide against the portion of the fastener 30 behind the face plate 20 as the slot 36 envelopes the face plate 20. The guide edge 74 also helps ensure that the cover 10 is being correctly positioned in engagement with the receptacle 12. The guide edges 68, 74 may be substantially parallel to one another. Alternatively, the guide edges 68, 74 may include obtuse portions so that they extend farther apart from one another closer to the opening 58. The guide edge 74 of the bottom portion 62 may also include a detent 76 configured to hold the portion of the fastener 30 behind the face plate 20 in engagement with the catch 72. The detent 76 may be a bump, a ball-and-spring detent, a flexible portion, or the like and cooperatively engage the portion of the fastener 30 positioned behind the face plate 20 with the catch 72.

The back wall 52 may define an opening 78 configured to partially surround a portion of the outlets 16 and/or internal fiber optic cables located between the face plate 20 and the receptacle 12. The opening 78 allows the cover 10 to completely engage the receptacle 12 while the top portion 60, the bottom portion 62, and the intermediate portion 64 strengthen the cover 10 by providing more material sandwiched between the face plate 20 and the face 18 of the receptacle 12.

The interior walls 54, 56 may extend from the slot 36 to the face wall 42 (as depicted in FIG. 4) and define a portion of the chamber 34 and the channels 38, 40. The interior walls 54, 56 may also, at least partially, extend from the side wall 50 to the other side wall 48. The interior walls 54, 56 reinforce the enclosure 32 and the channels 38, 40. However, the interior walls 54, 56 may form various shapes without departing from the scope of the present invention. For example, the interior walls 54, 56 may merely form hollow cylinders and/or hollow rectangular prisms that define portions of the channels 38, 40.

The channels 38, 40 provide access to the fasteners 28, 30 from outside the cover 10 so that a screwdriver or other tightening tool can enter the channels 38, 40, and tighten the fasteners 38, 30. The channels 38, 40 extend at least partially through the chamber 34 and to the slot 36. The channels 38, 40 may terminate at a distance from the catches 66, 72 wide enough to allow the face plate 20 and a portion of the fasteners 28, 30 to fit between the channels 38, 40 and the catches 66, 72. This enables the slot 36 to envelope the face plate 20 with a portion of the fasteners 28, 30 protruding (due to being loosened) from the face plate 20. The channels 38, 40 may have a radius, or height and width, large enough to allow a screwdriver to pass through the channels 38, 40. The channels 38, 40 may also have a radius, or height and width, large enough to allow one of the fasteners 28, 30 to pass through the channels 38, 40.

In use, the fasteners 28, 30 may be loosened from the face plate 20 to enable the face plate 20 to move a distance from the receptacle 12. The distance allows the back wall 52 to slide behind the face plate 20 so that the slot 36 can envelope the face plate 20.

The cover 10 may be positioned over the face plate 20. The back wall 52 is slid behind the face plate 20 so that it is positioned between the face plate 20 and the face 18 of the receptacle 12. The guide edges 68, 74 may slide against the portions of the fasteners 28, 30 located behind the face plate 20 as the cover 10 is positioned in engagement with the receptacle 12. The back wall 52 is slid behind the face plate 20 until the first side wall 48 abuts a side of the face plate 20 and/or the catches 66, 72 engage portions of the fasteners 28, 30 located behind the face plate 20. Once in place, the channels 38, 40 are aligned with the catches 66, 72 and fasteners 28, 30.

The fasteners 28, 30 are tightened thereby securing the cover 10 in engagement with the receptacle 12. A screw driver may be used to enter the channels 38, 40 and engage the fasteners 28, 30. The fasteners 28, 30 may be rotated so that they push the face plate 20 against the back wall 52, thereby sandwiching the back wall 52 between the face plate 20 and the face 18 of the receptacle 12.

The cover 10 may be disengaged from the receptacle 12 by loosening the fasteners 28, 30. The fasteners 28, 30 may be loosened in substantially the same way they were tightened so that the face plate 20 and face 18 of the receptacle 12 no longer sandwich the back wall 52. The cover 10 may then be removed from the receptacle 12. The back wall 52 may be slid from behind the face plate 20 as the walls 44, 46, 52, 54, 56 defining the slot 36 slide against the face plate 20 so that the face plate 20 is uncovered through the opening 58.

Figure 6:
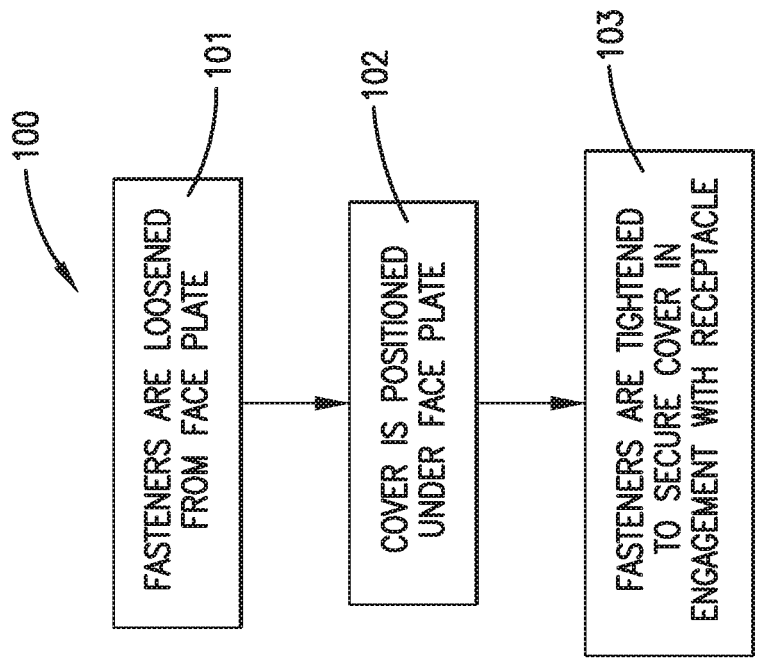
FIG. 6 is a flowchart illustrating at least a portion of the steps for attaching a cover according to embodiments of the present invention.

The flow chart of FIG. 6 depicts the steps of an exemplary method 100 of engaging the cover 10 with the receptacle 12. In some alternative implementations, the functions noted in the various blocks may occur out of the order depicted in FIG. 6. For example, two blocks shown in succession in FIG. 6 may in fact be executed substantially concurrently, or the blocks may sometimes be executed in the reverse order depending upon the functionality involved. In addition, some steps may be optional.

Referring to step 101, the fasteners 28, 30 are loosened from the face plate 20. Loosening the fasteners 28, 30 enables the face plate 20 to move a distance from the receptacle 12. The distance allows the back wall 52 to slide behind the face plate 20 so that the face plate 20 can be positioned in the slot 36.

Referring to step 102, the cover 10 is positioned over the face plate 20. As alluded to above, the back wall 52 is slid behind the face plate 20 so that it is positioned between the face plate 20 and the face 18 of the receptacle 12. The guide edges 68, 74 may slide against the portions of the fasteners 28, 30 located behind the face plate 20 as the cover 10 is positioned in engagement with the receptacle 12. The back wall 52 is slid behind the face plate 20 until the first side wall 48 abuts a side of the face plate 20 and/or the catches 66, 72 engage portions of the fasteners 28, 30 located behind the face plate 20. Once in place, the channels 38, 40 are aligned with the catches 66, 72 and fasteners 28, 30.

Referring to step 103, the fasteners 28, 30 are tightened thereby securing the cover 10 in engagement with the receptacle 12. A screw driver may be used to enter the channels 38, 40 and engage the fasteners 28, 30. The fasteners 28, 30 may be rotated so that they push the face plate 20 against the back wall 52, thereby sandwiching the back wall 52 between the face plate 20 and the face 18 of the receptacle 12.

The method 100 may include additional, less, or alternate steps and/or device(s), including those discussed elsewhere herein.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A cover for partially covering and protecting cables plugged into a receptacle having a face plate with a first hole through which a first fastener secures the face plate to a face of the receptacle, the cover comprising:
a plurality of walls at least partially defining—a hollow chamber,
a slot adjacent to the chamber and configured to permit the cover to slide over the face plate, and
a first channel extending partially through the chamber and configured to provide access to the first fastener.

2. The cover of claim 1, the plurality of walls comprising a back wall including a top portion having a first catch configured to receive a portion of the first fastener behind the face plate when the cover is engaged with the receptacle.

3. The cover of claim 2, the top portion including a first guide edge extending from the first catch to the opening.

4. The cover of claim 3, the first guide edge including a first detent configured to engage the portion of the first fastener when the cover is engaged with the receptacle.

5. The cover of claim 2, the back wall including an intermediate portion extending from the top portion to define a portion of the slot.

6. The cover of claim 5, the intermediate portion at least partially defining an opening located relative to the catch so that the intermediate portion partially surrounds a portion of an outlet located between the face plate and the face of the receptacle when the face plate is in the slot.

7. The cover of claim 2, the plurality of walls comprising a second interior wall at least partially defining a second channel.

8. The cover of claim 7, the back wall including a bottom portion having a second catch configured to receive a portion of a second fastener located behind the face plate when the cover is engaged with the receptacle.

9. The cover of claim 8, the bottom portion having a second guide edge extending from the second catch to the opening.

10. The cover of claim 8, the second channel extending partially through the chamber and aligned with the second catch.

11. The cover of claim 8, wherein a distance between an end of the first channel and the first catch is large enough to allow the face plate to be positioned therebetween, and a distance between an end of the second channel and the second catch is large enough to allow the face plate and a portion of the second fastener to be positioned therebetween.

12. The cover of claim 1, the plurality of walls comprising a first side wall located at an end of the slot opposite to the opening, the first side wall being configured to abut a side of the face plate when the face plate is in the slot.

13. The cover of claim 1, the plurality of walls comprising a first interior wall at least partially defining the first channel.

14. A cover for partially covering and protecting cables plugged into a receptacle having a face plate with a first hole and a second hole through which a first fastener and a second fastener secure the face plate to a face of the receptacle, the cover comprising:
- a plurality of walls at least partially defining—
  - a hollow chamber,
  - a slot adjacent to the chamber and configured to permit the cover to slide over the face plate,
  - an opening that leads to the chamber and the slot,
  - a first channel extending partially through the chamber and configured to provide access to the first fastener, and
  - a second channel extending partially through the chamber and configured to provide access to the second fastener.

15. The cover of claim 14, the plurality of walls comprising a back wall including—
   - a top portion defining an upper portion of the slot, the top portion having a first catch positioned on the top portion so that the first catch abuts a portion of the first fastener behind the face plate when the face plate is in the slot, the first catch being aligned with the first channel, and
   - a bottom portion at least partially defining a lower portion of the slot, the bottom portion having a second catch positioned on the bottom portion so that the second catch abuts a portion of the second fastener behind the face plate when the face plate is in the slot, the second catch being aligned with the second channel.

16. The cover of claim 15, the top portion including a first guide edge extending from the first catch to the opening.

17. The cover of claim 16, the first guide edge including a first detent positioned proximate to the first catch so that the first detent and the first catch cooperatively engage the portion of the first fastener behind the face plate when the face plate is completely in the slot.

18. The cover of claim 16, the bottom portion including a second guide edge extending from the second catch to the opening.

19. The cover of claim 18, the second guide edge including a second detent positioned proximate to the second catch so that the second detent and the second catch cooperatively engage the portion of the second fastener behind the face plate when the face plate is completely in the slot.

20. A cover for partially covering and protecting cables plugged into a receptacle having a face plate with a first hole and a second hole through which a first fastener and a second fastener secure the face plate to a face of the receptacle, the cover comprising:
- a face wall defining a portion of an inner chamber;
- a first side wall connected to the face wall and defining a portion of the inner chamber and configured to abut a side of the face plate when the cover is engaged with the receptacle;
- a first interior wall connected to the face wall and defining a portion of the inner chamber and a first guide channel;
- a second interior wall connected to the face wall and defining a portion of the inner chamber and a second guide channel;
- a back wall connected to the first side wall and located a distance from the first interior wall and the second interior wall to define a portion of a slot, the back wall including—
  - a top portion having a first catch positioned so that the first catch abuts a portion of the first fastener behind the face plate when the face plate is in the slot, the first catch being aligned with the first channel, and
  - a bottom portion having a second catch positioned so that the second catch abuts a portion of the second fastener behind the face plate when the face plate is in the slot, the second catch being aligned with the second channel; and
- a second side wall connected to the face wall opposite to the first side wall, the second wall defining an opening that leads to the slot and the inner chamber.

\* \* \* \* \*